United States Patent [19]

Avery

[11] 4,229,760
[45] Oct. 21, 1980

[54] VIDEO GAMES COLOR SYNTHESIS
[75] Inventor: Leslie R. Avery, Leefdaal, Belgium
[73] Assignee: RCA Corporation, New York, N.Y.
[21] Appl. No.: 34,742
[22] Filed: Apr. 30, 1979
[30] Foreign Application Priority Data
May 26, 1978 [GB] United Kingdom ............... 22986/78
[51] Int. Cl.$^2$ ............................................. H04N 9/535
[52] U.S. Cl. ................................... 358/22; 273/85 R; 358/82
[58] Field of Search ........................... 358/81, 82, 22; 273/85 R

[56] References Cited
U.S. PATENT DOCUMENTS

| 3,972,067 | 7/1976 | Peters | 358/81 |
| 4,068,847 | 1/1978 | Lukkarila et al. | 273/85 R |
| 4,139,863 | 2/1979 | Tuma | 358/82 |

FOREIGN PATENT DOCUMENTS 1507582 4/1978 United Kingdom .

OTHER PUBLICATIONS

Electronics, pp. 89–96, Jun. 24, 1976.

Primary Examiner—Robert L. Richardson
Attorney, Agent, or Firm—Eugene M. Whitacre; William H. Meagher; Ronald H. Kurdyla

[57] ABSTRACT

A color signal synthesis network suitable for use in a video games system includes a source of four mutually quadrature phased reference signals derived from a common source, a plurality of color signal transmission gates, and a plurality of resistive weighting and combining networks for coupling selected ones of the quadrature signals to an input of each gate. The values of resistors forming each weighting network determine the ratio of the amplitudes of the selected quadrature signals coupled thereby. The signals coupled by the weighting resistors are combined at the input of each gate to produce a resultant synthesized color signal having a color determining phase which is established by the vector sum of the weighted signal amplitudes. Each gate is enabled at appropriate times during each image scanning interval in response to applied control signals, to conduct the associated synthesized color signal to succeeding composite video signal encoding and processing circuits.

16 Claims, 6 Drawing Figures

VIDEO GAMES COLOR SYNTHESIS

This invention concerns an arrangement for synthesizing color signals utilized in a video games system such as can be employed together with a color television receiver or equivalent video signal processing system.

Numerous viewer entertainment video games systems are known, as are techniques for imparting color to displayed video games images and patterns. One such technique is disclosed in U.S. Pat. No. 4,068,847. In accordance with the technique described therein, two synthesized color signals are provided by phase splitting a color reference signal generated by a local oscillator. The phase of each phase split signal corresponds to the phase of a desired color. Where additional colors are desired, a phase splitter providing additional signal outputs at different phases is required. Color synthesis also can be provided by employing a D.C. control voltage to vary the amplitude of two signals which are vectorially summed, to produce a resultant signal with a phase determined by the relative amplitudes of the controlled signals. Another technique employs a pair of locally generated control signals for modulating the phase of a local reference signal oscillator in response to the locally generated control signals.

In accordance with the principles of the present invention it is recognized as desirable to provide color synthesis apparatus capable of accurately and predictably simulating a plurality of predetermined colors at any desired level of saturation. Apparatus disclosed herein for accomplishing this result requires a minimum of reactive components, and is readily adaptable to fabrication in an integrated circuit. In addition, the disclosed apparatus is advantageously arranged to prevent synthesized color information from contaminating a displayed image under monochrome conditions, when white image information is to be displayed.

Color synthesis apparatus according to the present invention includes a source of alternating signal at the frequency of a color synchronizing chrominance subcarrier component of a color television signal, means for deriving a plurality of reference signals in quadrature phase relationship from the alternating signal, and a plurality of electronic gates each having input, output and switching control terminals. A plurality of signal combining networks also is included. Each combining network includes first and second signal weighting impedances for coupling reference signals in selected proportions to respective inputs of the gates to produce a combined signal thereat. The values of the impedances of each combining network are mutually proportional so that a combined signal developed at each gate input exhibits a resultant phase corresponding to the phase of a desired color signal. The gates are selectively enabled to conduct respective combined color representative signals from the input to the output terminals at appropriate times during intervals corresponding to line scanning display intervals of a television signal. The gated color signals are afterwards utilized to form a simulated composite video signal suitable for application to a color television receiver.

In accordance with a feature of the invention, under monochrome signal conditions alternating signals appearing at the gate outputs are bypassed to a point of reference potential, so that following signal utilization circuits receive substantially no alternating reference signals from the gates under monochrome signal conditions.

Figure 1:
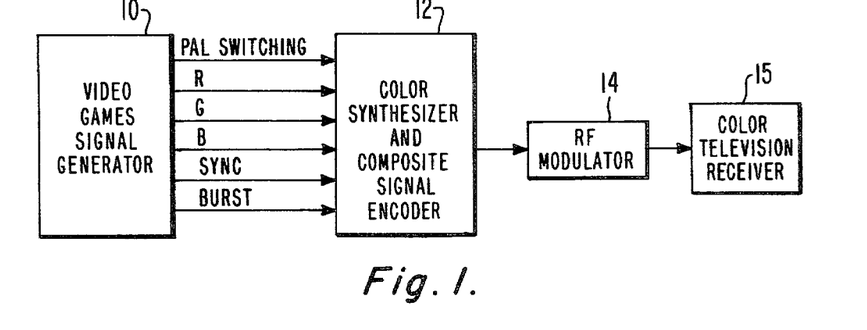
FIG. 1 is a block diagram showing a general arrangement of a video games system, including a color signal synthesizer and encoder according to the invention in a color television system.

In FIG. 1, a video games signal generator 10 (e.g., a microprocessor) provides a plurality of digital output signals appropriate for causing video games information to be displayed by a conventional color television receiver. Output signals from generator 10 include R, G, B color digital control signals produced during intervals when color information is to be displayed, image display timing synchronization (SYNC) digital control signals produced during intervals corresponding to television signal line scanning synchronization intervals, and a BURST digital control signal produced during an interval corresponding to the color burst reference interval of a color television signal, following the horizontal line synchronizing interval. In this example, it is assumed that the video games system operates in conjunction with a color television receiver arranged to receive television signals in accordance with PAL television broadcast standards. Accordingly, generator 10 also provides a PAL SWITCHING digital control signal output which is afterwards employed to assist in simulating the R-Y color difference signal component of a conventional PAL broadcast color television signal, which is switched in phase by 180° from line to line at the broadcast encoder, as is known. In this example, signal generator 10 includes signal processor integrated circuit types CDP1802, 1833, and 1864, which are available from the Solid State Division of RCA Corporation, Somerville, New Jersey. A suitable video games signal generator for generating the R, G, B PAL SWITCHING, BURST and SYNC control signals is the "Victory Home T.V. Programmer" available from Soundic Electronics, Ltd. of Causeway Bay, Hong Kong.

The output signals from unit 10 are supplied to inputs of a color synthesizer and composite signal encoder unit 12. As will be discussed, unit 12 includes oscillator, phase splitting, switching, logic control and signal combining networks for producing a simulated composite color television signal containing video games information to be displayed. A radio frequency (RF) modulator 14 of conventional configuration includes a source of RF carrier signal which is modulated by the composite information signal from unit 12. A simulated color television broadcast signal containing video games display information is coupled from an output of modulator 14 to an antenna input terminal of a color television receiver 15 arranged to process television signals according to PAL broadcast standards.

Figure 2:
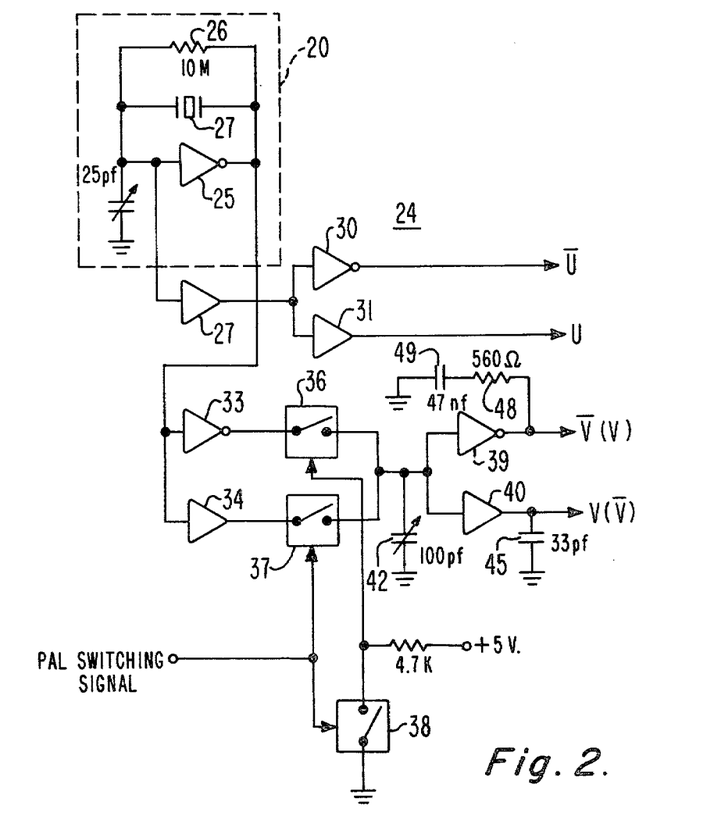
FIGS. 2 and 3 illustrate two embodiments of a reference oscillator and signal phase splitting network included in the color synthesizer of FIG. 1.

FIG. 2 shows an oscillator 20 and a phase splitting network 24 included in color synthesis and signal encoder unit 12 of FIG. 1. Phase splitter 24 provides U, V, $\overline{U}$ and $\overline{V}$ output reference signals to equal amplitude and mutual quadrature phase relationship from which color signals are synthesized, as will be discussed.

Oscillator 20 includes an inverting amplifier 25 arranged in feedback relationship with the parallel combination of a resistor 26, and a crystal filter 27 which is resonant at the frequency of the PAL system chrominance subcarrier signal (approximately 4.43 MHz). Mutually antiphase continuous wave reference signals at the subcarrier frequency appear at the input and output of amplifier 25.

Reference signals appearing at the input of amplifier 25 are buffered by a non-inverting amplifier 27, and afterwards supplied as inputs to an inverting amplifier 30 and a non-inverting amplifier 31 included in phase splitting network 24. A subcarrier reference signal U provided at the output of buffer 31 and a subcarrier reference signal $\overline{U}$ provided at the output of buffer 30 represent respectively inverted and non-inverted versions of the reference signal coupled from oscillator 20 via buffer 27.

Reference signals appearing at the output of oscillator amplifier 25 are supplied as an input to inverting buffer amplifier 33 and non-inverting buffer amplifier 34, output signals from which are respectively supplied to signal input terminals of transmission gates 36 and 37. Signal output terminals of gates 36, 37 are connected in common to inputs of an inverting buffer amplifier 39 and a non-inverting buffer 40. The PAL SWITCHING signal is applied to a switching control input terminal of gate 37 and to a switching control input of a transmission gate 38, which in this example is arranged to operate as a signal inverter. Gate 38 has an input terminal coupled to a source of reference potential (ground), and an output terminal coupled to the switching control input terminal of gate 36.

The arrangement of gate 38 together with the PAL SWITCHING signal serves to control the switching of gates 36, 37 for mutually oppositely phased action. For example, gate 36 is rendered conductive to couple signals between the gate input and output terminals, and gate 37 is rendered nonconductive to inhibit signal conduction between the gate input and output terminals for one switching phase of the PAL SWITCHING signal, and vice-versa for the other switching phase of the PAL signal. Accordingly, versions of the subcarrier reference signal from oscillator 20 appear as relatively inverted and non-inverted reference signals $\overline{V}$ and V at the outputs of buffers 39 and 40 for one switching phase of the PAL signal, and as relatively non-inverted and inverted signals V and $\overline{V}$ in response to the other switching phase of the PAL signal. The V and $\overline{V}$ signal phases are alternated at the beginning of each image scanning line in response to the PAL signal.

Amplifiers 30, 31, 33, 34, 39 and 40 preferably exhibit substantially identical signal propagation delays to avoid phase errors which can upset the desired antiphase relationship between the U, $\overline{U}$ and V, $\overline{V}$ signals. Compensation for such phase errors as do occur can be accomplished by additional compensation networks such as a capacitor 45 or the series combination of a resistor 48 and capacitor 49, arranged as shown. These elements are included to assure that the desired 180° phase difference is maintained between the U, $\overline{U}$ signals and between the V, $\overline{V}$ signals, and to also compensate for differences in the effective loading presented by succeeding circuits to which these signals are applied, as will be discussed.

The desired quadrature phase relationship between the U and V signals and between the $\overline{U}$ and $\overline{V}$ signals is obtained primarily by the additional signal propagation delay produced by buffers 33, 34 and transmission gates 36, 37 in the V and $\overline{V}$ signal processing path. Precise adjustment of the quadrature phase is obtained by adjusting variable capacitor 42, which acts in conjunction with the resistance associated with gates 36 and 37. Increasing the value of capacitor 42 causes an increase in the delay of the V, $\overline{V}$ signal path.

Figure 3:
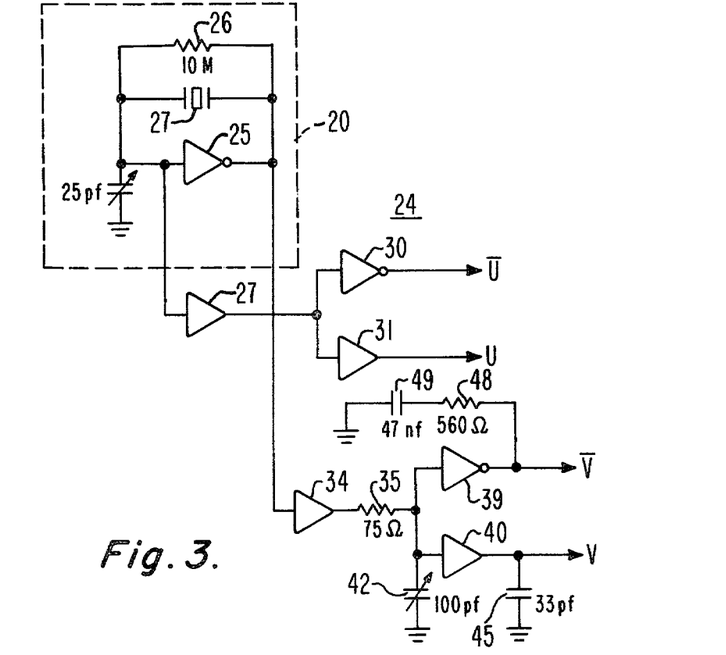

FIG. 3 shows an arrangement of oscillator 20 and phase splitter 24 of FIG. 2 adapted for use in conjunction with a video signal processing system employing NTSC television signals in accordance with United States televison broadcast standards. Similar elements are identified by the same reference number. The arrangement of FIG. 3 differs from that of FIG. 2 in that the PAL SWITCHING signal and associated circuit elements are not required, since line-by-line phase alternation of the R-Y color difference signal does not occur in an NTSC color television signal. Also, oscillator 20 is arranged to oscillate at the 3.58 MHz chrominance subcarrier signal frequency in accordance with NTSC standards.

The arrangement of FIG. 3 also differs from that of FIG. 2 in that a resistor 35 has been added. This resistor acts in conjunction with variable capacitor 42 to establish the signal propagation delay in the V, $\overline{V}$ signal path, and thereby the desired quadrature phase relationship, as mentioned in connection with FIG. 2.

The phase relationships of the U, $\overline{U}$, V and $\overline{V}$ signals, and the phase relationships of selected color representative signals developed as will be discussed, are illustrated by the self-explanatory vector diagram of FIG. 4.

Figure 5:
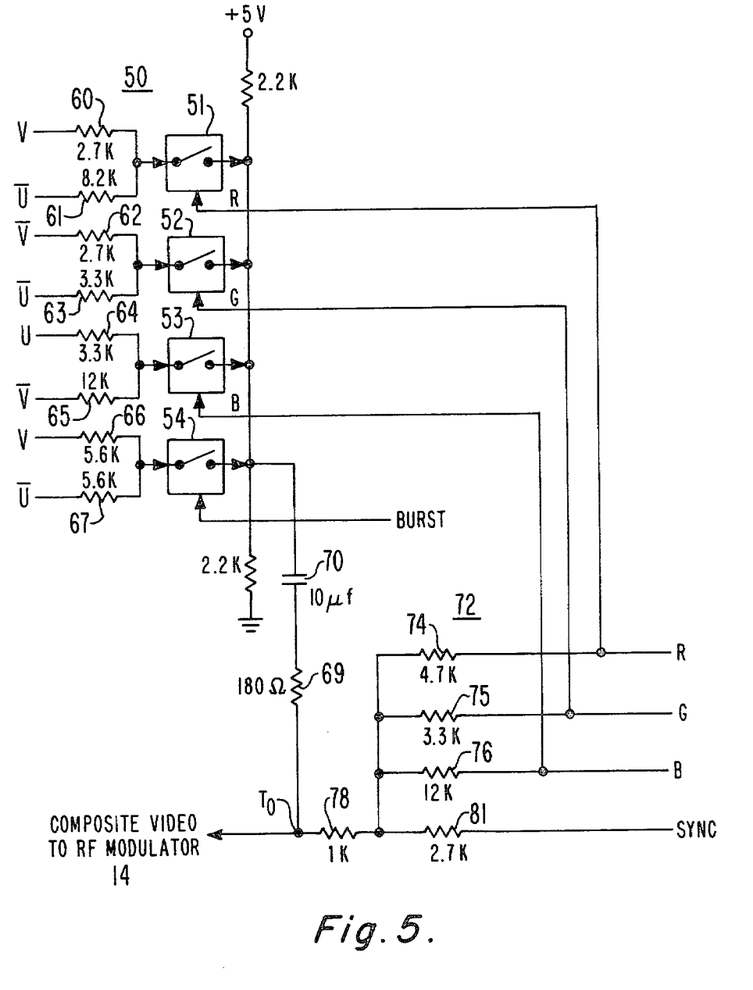
FIG. 5 shows one embodiment of a color signal synthesizer and encoder according to the present invention.

Referring now to FIG. 5, there is shown an embodiment of a color synthesizer and composite video signal encoder included in unit 12 of FIG. 1.

A color signal synthesis network 50 comprises a plurality of similar transmission gates 51–54 which are opened (rendered nonconductive) and closed (rendered conductive) at appropriate times in each image line scanning interval in response to applied digital control signals. Each of these gates has a signal input terminal coupled as shown to resistive signal weighting and combining networks including resistors 60 and 61, 62 and 63, 64 and 65, and 66 and 67, respectively. Selected ones of the U, $\overline{U}$, V and $\overline{V}$ signals from phase splitter 24 (FIG. 2 or 3) are coupled via separate weighting resistors 60-67 as shown, and are combined at respective signal input terminals of each of gates 51-54.

Gates 51, 52, 53 and 54 respectively correspond to red (R), green (G) and blue (B) and burst signal transmission gates. The resistor pairs associated with the input weighting network of each gate are weighted (i.e., proportioned) in value such that the ratio of the resistor values of each resistor pair, and therefore the ratio of the amplitudes of signals coupled thereby, produce a combined resultant signal at the input of each gate. The resultant signal exhibits a phase corresponding to the phase of the color signal to be transmitted and an amplitude corresponding to the level of color saturation. In this example, the absolute values of the weighting resistors associated with each of color gates 51-53 are chosen so that the synthesized color signals developed at the respective inputs of these gates exhibit amplitudes sufficient to produce substantially full color saturation. However, the amplitudes of these signals can be tailored to produce any desired level of color saturation, and need not be equal.

Figure 4:
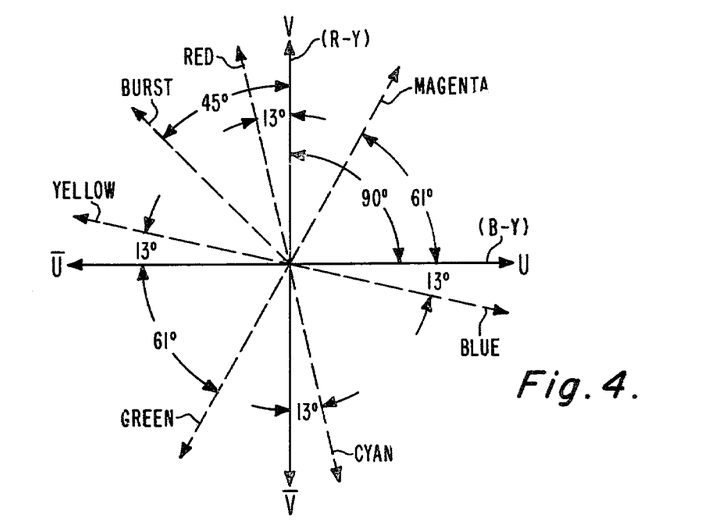
FIG. 4 depicts a signal vector diagram showing the relative phase relationships of color signals including signals generated by the synthesizer of FIG. 1.

Illustratively, from FIG. 4 it is seen that the signal vector for a red signal represents the resultant of a V signal component and a lesser component of the $\overline{U}$ signal, with a phase angle as shown. Resistors 60 and 61 are dimensioned so that this resultant signal is produced at the signal input terminal of red gate 51. Similarly, in a PAL color television system, the burst signal is seen as comprising the resultant of equal portions of the V and $\overline{U}$ signals. Equal value resistors 66 and 67 provide this resultant burst representative signal at the input of burst gate 54. When the described arrangement is employed in conjunction with a television system according to NTSC standards, the signal applied to the signal input of burst gate 54 is derived from the $\overline{U}$ signal alone, since the burst phase in an NTSC system is disposed along an axis which corresponds to the $\overline{U}$ signal phase axis. Thus resistor 66 and the V signal coupled thereby would not be employed in this instance.

It is noted that, when network 50 is fabricated in an integrated circuit, the resultant simulated signals developed at the inputs of gates 51-54 exhibit accurate and predictable amplitude and phase parameters. This results since these parameters are determined by the ratio of the weighting resistors, which can be accurately controlled in an integrated circuit environment.

Switching control terminals of gates 51-54 are respectively coupled to the R, G, B and BURST digital control signal outputs from signal generator 10 (FIG. 1). and signal output terminals of these gates are connected in common to an output signal combining terminal T$_0$ via a coupling resistor 69 and a capacitor 70.

The arrangement of FIG. 5 is capable of synthesizing the red (R), green (G) and blue (B) primary colors, as well as the yellow, cyan and magenta complementary colors (primary mixture colors) by causing one or more of gates 51-53 to be rendered conductive. A synthesized red color signal is produced by enabling gate 51 to conduct alone in response to an enabling R signal from unit 10. Likewise, a synthesized yellow color signal is produced by enabling red and green gates 51 and 52 to conduct in response to enabling R and G signals from unit 10. The BURST signal is supplied by unit 10 whenever color information is to be displayed. Gates 51-54 are enabled to conduct when the R, G, B control signals from unit 10 exhibit a high logic level (e.g., +5 volts).

Grey scale luminance signal information is simulated by means of a network 72 including resistors 74, 75 and 76 which couple the R, G, B outputs from unit 10 to output combining point T$_0$ via a resistor 78. The luminance information is simulated by establishing given ratios among the values of these resistors, to permit appropriate amounts of the R, G, B digital control signals from unit 10 to be coupled in grey scale proportions to combining point T$_0$. The ratios among the values of these resistors are also accurately controllable in an integrated circuit environment, and can be tailored to provide any desired grey scale luminance information within the black to white range.

A simulated composite color television signal developed at output terminal T$_0$ comprises the combination of the gated color signal outputs of gates 51-54, simulated luminance information supplied via network 72, and SYNC signal information supplied from unit 10 via resistor 78 and a resistor 81. The composite signal is afterwards supplied to RF modulator 14 (FIG. 1).

Synthesized yellow, cyan or magenta complementary colors produced when more than one of gates 51, 52 and 53 are rendered conductive tend to be slightly desaturated. Also, a slight color tint may be imparted to a displayed (white) image under monochrome conditions, when each of color gates 51, 52 and 53 is enabled. These effects are caused by signal cross-coupling and interaction between the output impedances of the conductive gates, and are substantially eliminated by the color synthesis network of FIG. 6.

Figure 6:
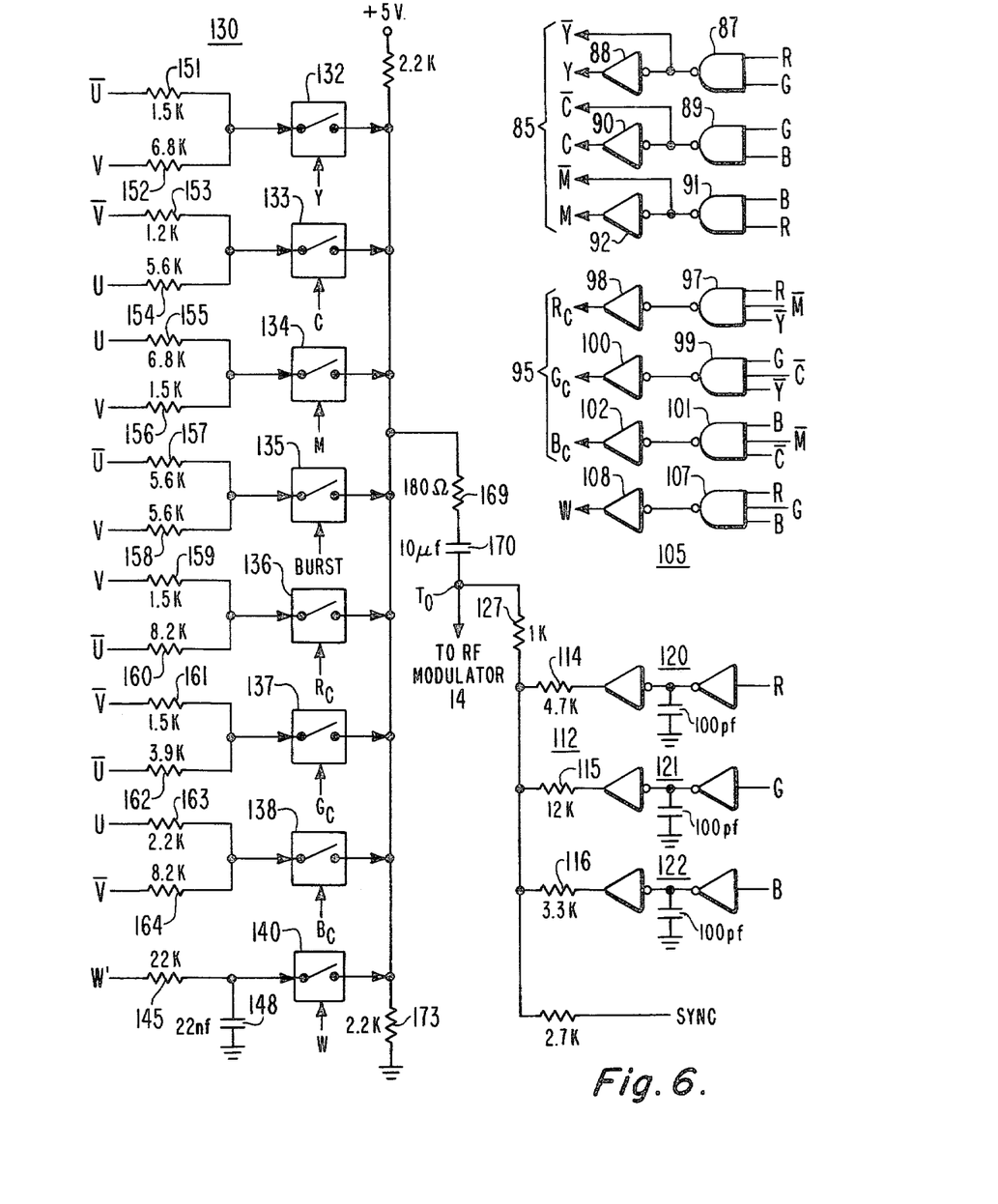
FIG. 6 shows another embodiment of a color synthesizer and encoder in accordance with the invention.

The color synthesis network of FIG. 6 is arranged to develop each of the primary and complementary color signals mentioned in connection with FIG. 5, as well as an auxiliary white information signal. For this purpose, a plurality of logic controlled transmission gates is provided, each gate being associated exclusively with one of these signals.

In FIG. 6, a complementary color logic control network 85 includes NAND gates 87, 89 and 91, and inverters 88, 90 and 92 respectively associated with each of the NAND gates as shown. The R, G, B control outputs of unit 10 are coupled to inputs of each of NAND gates 87, 89 and 91 as shown. Logic control signals Y, C and M are produced at the outputs of inverters 88, 90 and 92 when the R, G, B output signals from unit 10 indicate that yellow (Y), cyan (C), and magneta (M) color information is to be displayed, respectively. The logic complements $\overline{Y}$, $\overline{C}$ and $\overline{M}$ of these control signals appear at the outputs of NAND gates 87, 89 and 91.

In operation, a positive logic level (i.e., a logic "1" or +5 volts) is associated with the presence of a given color information signal to be displayed. For example, when yellow information is to be displayed, the R, and G signals from unit 10 alone exhibit a positive logic level, which produces a positive logic control level at the Y signal output of inverter 88 to indicate the existence of a yellow signal condition. At this time, the $\overline{Y}$ signal output is at the opposite logic level (i.e., a logic "0" or approximately zero volts). Also at this time, the outputs of NAND gates 89 and 91 exhibit a high logic level since the B output from unit 10 is at the zero or low logic level for this condition. The C (cyan) and M (magenta) control outputs from inverters 90 and 92 are at a zero logic level to indicate the absence of cyan and magenta color display conditions. The $\overline{C}$ and $\overline{M}$ outputs from gates 89 and 91 exhibit a high logic level to indicate the existance of a color signal condition which does not include either cyan or magenta display colors.

Logic control signals for the red, green and blue primary colors are generated by a logic network 95. Network 95 includes NAND gates 97, 99 and 101 and inverters 98, 100 and 102 respectively associated with each of NAND gates 97, 99, 101 as shown. The R, G, B control inputs to gates 97, 99 and 101 are supplied from the outputs of unit 10, and the $\overline{M}$, $\overline{Y}$ and $\overline{C}$ control inputs to these gates are supplied from logic network 85.

Network 95 produces positive logic control outputs R$_c$, G$_c$ and B$_c$ only when all of the inputs to the associated NAND gate are at a logic "one" level. For example, assume that red color information alone is to be displayed. The R control signal from unit 10 is at a logic one level, and the B, G control signals are at a logic zero level. The $\overline{Y}$ output of NAND gate 87 and the $\overline{M}$ output of NAND gate 91 therefore are at a logic "one" level. These signals and the R control signal are supplied as inputs to NAND gate 97, causing the output R$_c$ of inverter 98 to exhibit a logic "one" level, whereby red gate 136 is enabled to conduct. The logic statement for this operation is given as follows. Signal $R_c$ is at a one logic level when signals R, $\overline{Y}$ and $\overline{M}$ are at a one logic level, or when signal R is at a one logic level and signals G and B are at a zero logic level. Signal $\overline{Y}$ is at a one logic level when either or both of signals R and G are at a zero logic level, and signal $\overline{M}$ is at a high logic level when either or both of signals R and B are at a zero logic level. Analogous observations pertain to the $G_c$ (green) and $B_c$ (blue) control signals developed by network 95.

The absence of a color signal condition (i.e., a monochrome condition) is indicated when the R, G, B outputs from signals generator 10 are all at a high logic level. A control signal W indicative of this condition is provided by an auxiliary luminance white level or monochrome control network 105, including a NAND gate 107 and an inverter 108. Control signal W at the output of inverter 108 exhibits a high logic level when all of the R, G, B inputs to gate 107 are high.

Luminance information is simulated by means of a network 112 including proportional resistors 114, 115 and 116. This network corresponds to network 72 which was discussed in connection with FIG. 5. In this example, however, the R, G, B control signals are coupled to resistors 114–116 by means of similar delay equalization networks 120, 121 and 122, respectively. Each delay network comprises a pair of series inverters and a filter capacitor arranged as shown. The delay provided by these networks compensates for signal propagation delays associated with the gating action of networks 85, 95 and 105, so that the synthesized luminance and chrominance components of a simulated composite video signal developed by this arrangement are correctly timed when combined at terminal $T_0$.

The SYNC signal output from unit 10 and the combined simulated luminance information from network 112 are summed in a resistor 127 and appear in combined form at output terminal $T_0$ together with synthesized color information signals generated as follows.

A color synthesis network 130 comprises a plurality of similar signal transmission gates 132–138, and a signal weighting and combining network comprising a plurality of pairs of resistors 151–164. Selected ones of the U, V, $\overline{U}$ and $\overline{V}$ signals from phase splitter 24 (FIG. 2 or 3) are coupled to separate ones of weighting resistors 151–164 as shown. Each of gates 132–138 has a signal input terminal coupled to one of the resistor pairs, for receiving a combined signal having an amplitude and phase determined by the value of the weighting resistors, as discussed in connection with FIG. 5. Thus yellow (Y) signal gate 132 receives a combined signal representing the resultant of signal $\overline{U}$ weighted in accordance with the value of resistor 151, and signal V weighted according to the value of resistor 152. Signal output terminals of gates 132–138 are connected in common.

Color synthesis network 130 is similar to corresponding network 50 in FIG. 5, except that network 130 provides a separate gate (i.e., gates 132, 133 and 134) and an associated input weighting network for each of the yellow, cyan and magenta complementary colors. Only one of gates 132–138 is enabled to conduct an associated synthesized color signal, when any one of the primary or complementary colors is to be displayed in response to the R, G, B control signals from unit 10. For this purpose, the switching control input terminals of complementary color gates 132, 133 and 134 are respectively coupled to the Y (yellow), C (cyan) and M (magenta) logic control signals from network 85. Similarly, the switching control inputs of primary color gates 136, 137 and 138 receive $R_c$ (red), $G_c$ (green) and $B_c$ (blue) control inputs from network 95. Burst gate 135 corresponds to gate 54 in FIG. 5.

The synthesized color signal which is conducted by an enabled gate is coupled to output terminal $T_0$ via a coupling resistor 169 and capacitor 170, where it combines with the SYNC information signal and simulated luminance information to form a simulated composite color video signal suitable for application to RF modulator 14.

With this arrangement, interaction including signal cross-coupling effects among gates 132–138 is substantially eliminated, since only one gate is enabled at a time. Also, signals from logic networks 85 and 95 assure that only that color is displayed which is intended to be displayed, by enabling the correct color gate. Direct current switching transients associated with the switching of gates 132–138 are substantially eliminated, since the outputs of these gates are biased at a level substantially equal to one-half the operating supply level (+5 volts). With this output biasing, the continuous wave reference signal is symmetrical about the bias level and substantially no D.C. level shift is introduced as a result of the continuous wave color reference signals being conducted by any of gates 132–138.

Under monochrome conditions when white image information is to be displayed, a white signal gate 140 is enabled to conduct in response to the white control signal W developed by network 105 as already discussed. Any leakage color signals which appear at outputs of any of gates 132–138 are then bypassed to ground by means of a low impedance A.C. path including conductive gate 140 and a capacitor 148, to prevent monochrome displays from becoming contaminated with any color information which may be present.

The network including gate 140 and capacitor 148, together with a resistor 145 and a source of positive D.C. voltage W', also permit the white level of a displayed monochrome image to be modified. For example, the image white level can be modified towards a "whiter-than-white" level when the level of voltage W' approaches or equals the level of the +5 volt operating supply, as follows.

Prior to a demand for white information to be displayed, capacitor 148 is charged to the level of voltage W' via resistor 145. Capacitor 148 discharges through gate 140 when this gate is rendered conductive, causing a voltage pulse to appear across a resistor 173 at the output of gate 140. The magnitude of this pulse corresponds to a "whiter-than-white" level, and is coupled via resistor 169 and capacitor 170 to output terminal $T_0$. In this example, the magnitude of the pulse as coupled to terminal $T_0$ exceeds the simulated luminance level provided by network 112. The effect of this pulse is to impart a "whiter-than-white" level to the composite signal appearing at terminal $T_0$ under monochrome conditions.

The described voltage pulse exhibits a relatively short duration. Such a pulse duration is nevertheless appropriate in a color (video games) display system, in which color information will predominate and white information will typically be demanded on an intermittent, short-term basis. Therefore, capacitor 148 can be small as shown in order to facilitate integration of the described system, although the value of capacitor 148 can be increased if longer duration pulses are required. Also, the magnitude of the pulse can be tailored for a particular system by tailoring the value of the voltage W' to provide some other white reference level, including a level less than that provided by network 112 for a grey (subtractive) effect.

The described color synthesizing and signal encoding arrangements can be fabricated entirely in a single integrated circuit, or by employing a number of separate, commercially available integrated circuit types.

Only four locally generated signals (U, $\overline{U}$, V, $\overline{V}$) derived from a common source are necessary to synthesize any color signal by employing the resistive signal weighting and combining technique disclosed herein. Accurate, predictable color phases and saturation levels are produced, particularly with the arrangement of FIG. 6.

What is claimed is:

1. Apparatus for synthesizing color signal information corresponding to color information contained in the chrominance component of a color television signal also including a color synchronizing chrominance subcarrier component, said apparatus comprising:

means for providing an alternating signal at the frequency of said subcarrier signal;

means for deriving a plurality of reference signals in quadrature phase relationship from said alternating signal;

a plurality of signal gating means each having a signal input terminal, a signal output terminal, and a switching control input terminal;

a plurality of means for combining said reference signals at respective input terminals of said gating means in selected proportions, said combining means each including first and second signal weighting impedances for coupling said reference signals to said input terminals, the values of said impedances of each combining means being mutually proportioned such that a combined signal developed at each said input terminal exhibits a resultant phase corresponding to the phase of a desired color signal;

control means coupled to said switching control input terminals of said gating means for selectively enabling said gating means to conduct respective combined color representative signals from said input terminal to said output terminal at appropriate times during intervals corresponding to line scanning display intervals of said television signal; and utilization means for receiving signals conducted by said gating means.

2. Apparatus according to claim 1, wherein:

said reference signals include a first pair of first and second complementary phase reference signals and a second pair of third and fourth complementary phase reference signals, said first pair of reference signals being in quadrature phase relationship with said second pair of reference signals.

3. Apparatus according to claim 2, wherein:

said gating means comprises first, second and third gating means; and said combining means comprises first, second and third combining means for combining selected ones of said quadrature signals in given proportions at respective input terminals of said first, second and third gating means, such that combined signals developed at respective inputs of said gating means exhibit mutually different phases each corresponding to the phase of a primary color signal.

4. Apparatus according to claim 3, wherein:

said first and third reference signals exhibit a mutual quadrature phase relationship, said third signal phase lagging said first signal phase;

said second and third reference signals exhibit a mutual quadrature phase relationship, said second signal phase lagging said third signal phase;

said second and fourth reference signals exhibit a mutual quadrature phase relationship, said fourth signal phase lagging said second signal phase;

said fourth and first reference signals exhibit a mutual quadrature phase relationship, said first signal phase leading said fourth signal phase;

said first combining means combines selected portions of said second and third reference signals to produce a combined signal at said input of said gating means corresponding to a first primary color;

said second combining means combines selected portions of said second and fourth reference signals to produce a combined signal at said input of said second gating means corresponding to a secondary primary color; and said third combining means combines selected portions of said first and fourth reference signals to produce a combined signal at said input of said third gating means corresponding to a third primary color.

5. Apparatus according to claim 4 and further including fourth, fifth and sixth gating means, each having signal input and output terminals and a switching control input terminal; and respectively associated fourth, fifth and sixth combining means, wherein:

said fourth combining means combines selected portions of said second and third reference signals to produce a combined signal at said signal input of said fourth gating means corresponding to a first complementary color;

said fifth combining means combines selected portions of said first and fourth reference signals to produce a combined signal at said signal input of said fifth gating means corresponding to a second complementary color; and said sixth combining means combines selected portions of said first and third reference signals to produce a combined signal at said signal input of said sixth gating means corresponding to a third complementary color.

6. Apparatus according to claim 5, wherein:

said control means provides first, second and third output control signals during intervals corresponding to image display intervals of said television signal, when primary color information corresponding to said first, second and third color signals is present; and wherein said apparatus further comprises:

first logic means responsive to said first and second control signals for producing a first logic signal indicating the presence of a first complementary color condition, and the logic complement thereof;

second logic means responsive to said second and third control signals for producing a second logic signal indicating the presence of a second complementary color condition, and the logic complement thereof;

third logic means responsive to said first and third control signals for producing a third logic signal indicating the presence of a third complementary color condition, and the logic complement thereof;

fourth logic means responsive to said first control signal and to said first and third logic complements for producing a fourth logic signal;

fifth logic means responsive to said second control signal and to said first and second logic complements for producing a fifth logic signal;

sixth logic means responsive to said third control signal and to said second and third logic complements for producing a sixth logic signal; and means for coupling said first, second, third, fourth, fifth and sixth logic signals to said switching control input terminals of said fourth, fifth, sixth and first, second, third gating means, respectively, to enable said gating means to conduct during intervals corresponding to image display intervals of said television signal.

7. Apparatus according to claim 2, wherein:
said impedances comprise resistors.

8. Apparatus according to claim 1 and further comprising:
means including first and second operating potentials for biasing said signal output terminals of said gating means at a potential substantially midway between said first and second potentials.

9. Apparatus according to claim 1, and further comprising:
color synchronizing gating means having a signal input terminal for receiving a color synchronizing signal derived from said plurality of reference signals, a signal output terminal coupled to said utilization means, and a switching control input terminal coupled to said control means.

10. Apparatus according to claim 9, wherein said control means provides output control signals coupled to respective switching control terminals of said gating means, including:
plural control signals during the intervals corresponding to image display intervals of said television signal, when color information is present; and
a control signal during intervals corresponding to a color synchronization interval of said television signal, when color information is present; and wherein
said control means also provides an image line synchronizing control signal during intervals corresponding to image line scanning synchronization intervals of said television signal.

11. Apparatus according to claim 10, and further including:
means for summing said plural control signals in given proportions appropriate for producing a summed signal representative of a luminance information signal component of said television signal.

12. Apparatus according to claim 11, wherein:
said summing means includes plural impedance means proportioned in value to establish said given proportions of said summed plural control signals.

13. Apparatus according to claim 7, wherein:
said utilization means combines color representative signals including said color synchronization signal conducted by said gating means, said line synchronizing control signal, and said summed luminance representative signal, to form a composite video signal.

14. Apparatus according to claim 13, and further comprising:
means responsive to said plural control signals for providing a luminance control signal under monochrome signal conditions;
a source of reference voltage; and
auxiliary gating means having an input terminal coupled to said source of reference voltage, and output terminal coupled to said utilization means, and a switching control input terminal for receiving said luminance control signal, said auxiliary gating means being rendered conductive in response to said luminance control signal for coupling a version of said reference voltage to said utilization means to thereby modify the luminance information content of said composite video signal.

15. In combination with a color television receiver including image display means and means for processing a color television signal having a signal component containing color information to be displayed and a color synchronizing subcarrier signal component, apparatus for synthesizing said color information comprising:
means for providing an alternating signal at the frequency of said subcarrier signal;
means for deriving a plurality of reference signals in quadrature phase relationship from said alternating signal;
a plurality of signal gating means each having a signal input terminal, a signal output terminal, and a switching control input terminal;
a plurality of means for combining said reference signals at respective input terminals of said gating means in selected proportions, said combining means each including first and second signal weighting impedances for coupling said reference signals to said input terminals, the values of said impedances of each combining means being mutually proportioned such that a combined signal developed at each said input terminal exhibits a resultant phase corresponding to the phase of a desired color information signal;
control means coupled to said switching control input terminals of said gating means for selectively enabling said gating means to conduct respective combined color representative signals from said input terminal to said output terminal at appropriate times during intervals corresponding to line scanning intervals of said television signal;
signal translating means for receiving signals conducted by said gating means; and
means for coupling signals from said signal translating means to said signal processing means of said color television receiver.

16. Apparatus for synthesizing color signal information corresponding to color information contained in the chrominance component of a color television signal also including a color synchronizing chrominance subcarrier component, said apparatus comprising:
means for providing an alternating signal at the frequency of said subcarrier signal;
means for deriving a plurality of reference signals with mutually different phases from said alternating signal;
a plurality of signal gating means each having a signal input terminal, a signal output terminal, and a switching control input terminal;
a plurality of means for combining selected ones of said reference signals at respective input terminals of said gating means in selected proportions, said combining means each including first and second signal weighting impedances for coupling said selected reference signals to said input terminals, the values of said impedances of each combining means being mutually proportioned such that a combined signal developed at each said input terminal exhibits a resultant phase corresponding to the phase of a desired color signal;

control means for providing control signals to said switching control input terminal of said gating means for selectively enabling said gating means to conduct respective combined color representative signals from said input terminal to said output terminal at appropriate times during intervals corresponding to line scanning display intervals of said television signal;

utilization means for receiving signals conducted by said gating means; and means coupled to said output terminals of said gating means for bypassing alternating signals appearing at said output terminals to a point of reference potential in response to a control signal from said control means indicative of a monochrome signal condition, so that said utilization means receives substantially no alternating reference signals from said gating means under monochrome signal conditions.

* * * * *